J. R. NICHOLS.
LOCKING MECHANISM FOR MOTOR VEHICLES.
APPLICATION FILED MAY 4, 1920.
1,359,729.
Patented Nov. 23, 1920.
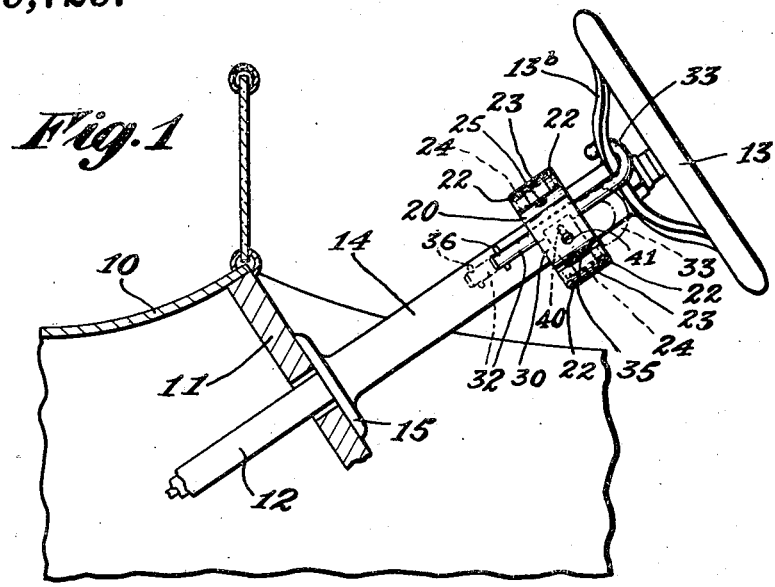
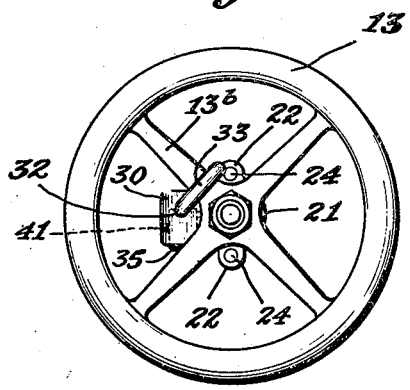
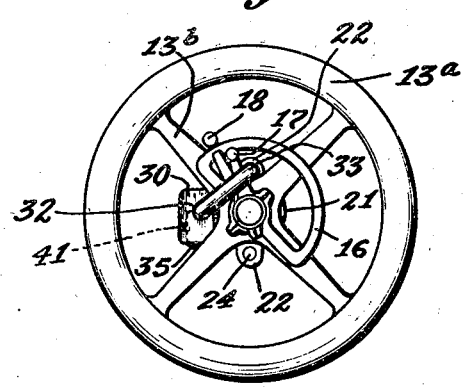
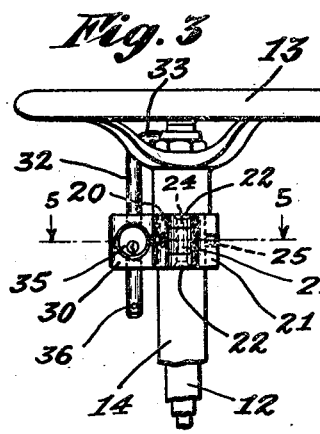
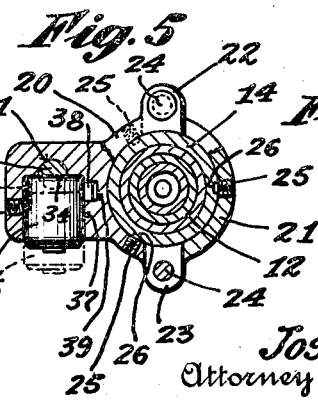
Inventor
Joseph R. Nichols.
Attorney
Frank Warren

UNITED STATES PATENT OFFICE.

JOSEPH R. NICHOLS, OF SEATTLE, WASHINGTON.

LOCKING MECHANISM FOR MOTOR-VEHICLES.

1,359,729.  Specification of Letters Patent.  Patented Nov. 23, 1920.

Application filed May 4, 1920. Serial No. 378,869.

*To all whom it may concern:*

Be it known that I, JOSEPH R. NICHOLS, a citizen of the United States, residing at Seattle, in the county of King and State of Washington, have invented a certain new and useful Improvement in Locking Mechanism for Motor-Vehicles, of which the following is a specification.

My invention relates to improvements in locking mechanisms and relates more particularly to the type of locks that are adapted for use on motor vehicles and the object of my invention is to provide means for temporarily locking the steering and power regulating mechanisms of a motor vehicle so that the vehicle cannot be operated by unauthorized persons during the absence of the owner of said vehicle.

Another object is to provide a locking mechanism that is adapted to be fixedly secured to the steering column of a motor vehicle, which mechanism is provided with a coöperating hook member which is adapted, when the vehicle is left unattended, to engage and clamp the steering wheel and power controlling levers of the vehicle in an effective manner.

A further object is to provide a locking mechanism embodying means whereby the hook member may be quickly and easily released from the locking element upon the insertion of the proper key.

A still further object is to provide a. locking mechanism which will be efficient and positive in its operation, capable of being quickly connected or disconnected with the controlling mechanism of a motor vehicle and which is strong and durable in construction whereby it will be impossible to injure the same.

A still further object is to provide a locking mechanism that is adapted for installation on any of the well known types of motor vehicles without any alterations to the steering post and with very little alterations to the steering post housings of the motor vehicle.

A still further object is to provide a locking mechanism that is adapted when in its inoperative or unlocked position to be moved entirely out of the path of the steering wheel and power controlling levers, thereby permitting free and unobstructed operation of the same.

With the above and other objects in view which will appear as the description proceeds, the invention resides in the novel construction, combination, adaptation and arrangement of parts hereinafter described and claimed.

I accomplish these objects by devices illustrated in the accompanying drawings, wherein—

Figure 1 is a fragmentary view partly in vertical section and partly in elevation of the forward end of a motor vehicle including the steering wheel and column upon which a locking mechanism embodying my invention is installed;

Fig. 2 is a top plan view of the steering wheel illustrating the method of locking the same;

Fig. 3 is a view in elevation taken perpendicular to the view illustrated in Fig. 1;

Fig. 4 is a similar view illustrating the method of locking the steering wheel and controlling levers;

Fig. 5 is an enlarged view in cross-section taken on broken line 5, 5 of Fig. 4; and Fig. 6 is a view in elevation of the hook member of my locking mechanism.

Referring to the drawings, throughout which like reference numerals indicate like parts, the numeral 10 designates the hood of a motor vehicle, 11 designates the cowl or dash board, 12 the steering post, 13 the steering wheel and 14 the fixed steering post housing, all of which are of well known form of construction.

The steering post housing 14 may terminate at the cowl 11 and is adapted to be fixedly secured thereto by a flange 15 which may be integral with the lower end of the said housing 14.

In Figs. 1, 2 and 3 I have illustrated my locking mechanism adapted for locking the steering wheel 13 exclusively while in Fig. 4 I have shown my locking mechanism adapted to lock the steering wheel 13ª and which is further adapted to lock in an inoperative position the spark and throttle levers 17 and 18, which are disposed on the upper side of the steering wheel in a well known manner. My locking mechanism being equally well adapted for use with and to positively lock either type of the steering wheel apparatus described above.

The locking mechanism proper comprises a sectional collar formed in two sections 20 and 21 that are adapted to be disposed around and to be fixedly secured to the upper end of the housing 14 adjacent the steering wheel 13.

The sections 20 and 21 are provided with diametrically opposite outwardly projecting lugs 22 and 23, respectively, which are adapted to be fixedly secured together as a unit by rivets 24, and the nuts 24 may be countersunk to prevent their removal by persons wishing to steal the car.

The sections 20 and 21 are further provided with radially disposed inwardly directed screw-threaded pins 25, the inner end of which are adapted to seat or project into the holes 26 formed in the housing 14 thereby preventing axial or circumferential movement of the collar on the housing 14.

Integral with the section 20 is an outwardly projecting boss 30 which is disposed substantially at right angles to the lugs 22 on said section, the boss 30 being provided with a perforation or hole 31, the axis of the hole 31 being substantially in a plane parallel to the plane of the axis of the housing 14.

Slidably disposed in the hole 31 is a locking member 32 having a hook portion 33 formed on its upper end and being further provided with a slot 34 formed substantially mid-way of the length thereof, the slot 34 being adapted to register with and be engaged by the inner end of a cylindrical lock 35 when the member 32 is in an operative or locked position. To prevent the complete withdrawal of the locking member 32 when the lock 35 has been unlocked to release the same I have provided a pin 36 for the lower end of the member 32 which is diametrically disposed within the lower end and projecting radially therefrom a sufficient distance on each side thereof to positively engage the lower face of the boss 30 when the member 32 has been unlocked and is withdrawn to the limit of its upward movement.

The cylindrical lock 35 may be of any well known type and is adapted to be disposed for limited axial movement within a bore or seat 37 provided in the boss 30, the axis of the bore 37 being substantially perpendicular to and radiating from the axis of the locking member 32 as shown more clearly in Fig. 5.

As hereinbefore described the inner end of the lock 35 is adapted to register with and engage the slot 34 on the member 32 thereby positively retaining and locking the member in an operative position, in which position the radial spring bolt or tumbler 38 of the lock 35 is adapted to seat in a recess 39 formed in the boss 30.

To unlock the mechanism the proper key is inserted in the lock 35 and is operated to withdraw or release the bolt 38 from its complementary recess 39 thereby permitting the lock 35 being withdrawn outwardly to the position indicated by the broken lines in Fig. 5. In this position the inner end of the lock 35 is clear of the slot 34 thus freeing the member 32 which may be pulled upwardly to disengage the hook portion 33 from the spoke or radial arm 13ᵇ of the wheel 13 or the spark and control levers 17 and 18 of the wheel 13ᵃ after which the member 32 is partially rotated so that the portion 33 will clear the wheel 13 and its associated parts when the member 32 is pushed downwardly to its inoperative position as indicated by broken lines in Fig. 1 to be out of the way during the operation of the vehicle.

To prevent the complete withdrawal of the cylindrical lock 35 I have provided a longitudinal slot 40 in the peripheral wall thereof, which slot is adapted to receive the inner end of an inwardly projecting screw threaded pin 41 disposed in the boss 30.

In the operation of the locking mechanism the hook member 32 is elevated from the position shown by broken lines in Fig. 1 after which it is partially rotated and pushed downwardly to permit the hook portion 33 of the same straddling and positively engaging and securing the spoke 13ᵇ of the wheel 13 as shown by full lines in Figs. 1, 2 and 3. In this position the slot 34 is adapted to register with and receive the inner end of the lock 35 which is pushed inwardly from the position shown in broken lines in Fig. 5 to the position shown in full lines in the same figure. In the last named position of the lock 35 the spring bolt 38 seats in the recess 39 thereby locking the mechanism and securing the vehicle against theft. The unlocking operation is accomplished by the description above given.

It will thus be seen that I have provided a locking mechanism in which the objects of my invention are achieved and all of the advantageous features above mentioned are present. The lock is positive in operation, of few parts which are so related that it is impossible for the same to become lost or stolen. The mechanism may be readily operated upon the insertion of the proper key and the parts are so constructed that when once set the same will be insured against slipping so as to render the operation of the lock entirely reliable.

From the foregoing description taken in connection with the drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the following claims.

What I claim is:

1. A locking mechanism for the steering apparatus of a motor vehicle comprising a sectional collar adapted to be secured to the fixed steering post housing of said apparatus, an outwardly projecting boss on one of the sections of said sectional collar having a perforation formed therein, the axis of said perforation being substantially in a plane parallel to the plane of the axis of said fixed steering post, the said boss also having a cylindrical recess formed therein, the axis of which being substantially perpendicular to the axis of the perforation and adapted to radiate therefrom, a locking member slidably disposed for limited movement within said perforation having a slot formed on one side thereof, a hook disposed on the upper end of said locking member adapted to straddle and engage a spoke of the steering wheel and the power control levers of said vehicle, a diametrically disposed pin on the lower end of said locking member adapted to project radially therefrom to limit the upward travel of said member, a cylindrical lock slidably disposed for limited movement and locking engagement within said cylindrical recess in said boss and having a longitudinal slot formed in the peripheral wall thereof, the inner end of the said cylindrical lock being adapted to register with and to be engaged in the said slot in said locking member, and means carried by said collar engageable in said longitudinal slot in said cylindrical lock.

2. In combination with the steering apparatus of a motor vehicle, of a locking mechanism comprising a sectional collar secured to the housing post of said motor vehicle, set screws connecting said collar and said housing post to prevent circumferential and axial movement of said collar, an outwardly projecting boss, on one of the sections of said sectional collar having a perforation formed therein, the axis of said perforation being substantially in a plane parallel to the plane of the axis of said housing, the said boss also having a cylindrical recess formed therein the axis of which being substantially perpendicular to the axis of said perforation and adapted to radiate therefrom, a locking member slidably disposed for limited movement within the said perforation and having a longitudinal slot formed on one side thereof, a hook disposed on the upper end of said locking member and adapted to straddle and engage a spoke of the steering wheel and the power control mechanism of said vehicle, a diametrically disposed pin mounted in the lower end of said locking member adapted to project radially therefrom to engage said boss thereby limiting the upward travel of said member, a cylindrical lock slidably disposed for limited movement and locking engagement within said cylindrical recess formed in said boss and having a longitudinal slot in the periphery thereof, the inner end of said cylindrical lock being adapted to register with and to be engaged in the slot in said locking member, and a set screw carried by said collar having its inner end engageable in the longitudinal slot in the periphery of said cylindrical lock.

In witness whereof, I hereunto subscribe my name this 28th day of April, A. D. 1920.

JOSEPH R. NICHOLS.